United States Patent [19]
Zaffaroni

[11] 3,876,816
[45] Apr. 8, 1975

[54] NONABSORBABLE, NONNUTRITIVE SWEETENERS
[75] Inventor: Alejandro Zaffaroni, Atherton, Calif.
[73] Assignee: Dynapol, Palo Alto, Calif.
[22] Filed: Oct. 25, 1972
[21] Appl. No.: 300,499

[52] U.S. Cl. ............... 426/217; 426/212; 426/213; 426/364; 426/380; 424/49; 131/144
[51] Int. Cl. .............................................. A23l 1/26
[58] Field of Search ........... 426/212, 213, 215, 217, 426/380, 364; 424/48, 49; 131/144

[56] References Cited
UNITED STATES PATENTS
2,596,852  5/1952  Heggie .................................. 426/6
3,097,946  7/1963  Menzi ............................ 426/213 X
3,705,039  12/1972  Mitsuhashi et al. ............. 426/215 X Primary Examiner—Raymond N. Jones
Assistant Examiner—Esther L. Massung
Attorney, Agent, or Firm—William H. Benz; Paul L. Sabatine

[57] ABSTRACT

Novel, nonabsorbable nonnutritive sweeteners of the general formula $(Am)_{\tilde{n}}C$ wherein Am is a means for producing a sweetening response in a sensory environment, C is a means for essentially controlling the absorption of Am in a biological environment, $\sim$ is a means for permanently covalently bonding Am to C, and n is at least one. The nonabsorbable nonnutritive sweeteners are useful for producing a sweet effect without any substantial absorption of the nonabsorbable nonnutritive sweetener in the biological environment.

8 Claims, No Drawings

3,876,816

NONABSORBABLE, NONNUTRITIVE SWEETENERS

FIELD OF THE INVENTION

This invention pertains to both a novel and useful composition of matter. More particularly, the invention relates to nonnutritive sweeteners suitable for producing a sensory response of sweetness in animals including humans and avians without any appreciable biological absorption, metabolism or assimilation of the sweetening agent. Specifically, the invention concens nonnutritvie sweeteners comprised of an active sweetening group bonded through a convalent bond that substantially resists rupture in the environment of use to a molecule whose molecular dimensions prevent its absorption. That is, on oral ingestion by a host the nonnutritive sweetener composition produces a sweetening effect without any appreciable metabolic digestion, absorpiton or assimilation so that the nonnutritive sweetener is eliminated essentially intact from the host. The nonnutritive sweeteners can be used singly or admixed with foods including beverages, medicinals and the like.

BACKGROUND OF THE INVENTION

Sweetness is one of the primary taste and cravings of both animals and humans. The universal use of naturally occurring and synthetic sweeteners to satisfy this natural craving has not been met without its accompanying physiological disadvantages. For example, the use of naturally occurring carbohydrate type sweetening compounds, that have an inherent food value, has historically exacted of the user the price of obesity, nutritional imbalance and dental decay. To overcome these unwanted disadvantages considerable research efforts and expenditures have been made to develop alternative compounds for the naturally occurring sweeteners, mainly to synthesize artificial sweeteners, that have no food value, do not cause tooth decay and are free of caloric imput. While these artifical sweeters enjoyed a wide use, and fulfilled the requirements of a sweet taste with no food value, and could be used without providing calories or damaging teeth, they were frequently found to possess inherent disadvantages that prevented their use for their intended purpose. For example, one artificial sweetener, p-ethoxyphenylurea, was found to be toxic to certain animals and accordingly could not be safely recommended for use as a sweetener. Similarly, another widely used artificial sweetener, sodium cyclamate, seemingly was found to cause chromosome damage and bladder trouble in experimential animals which made it apparently unacceptable for animal and human consumption. In view of the disadvantages associated with the prior art forms of naturally occurring or synthetic sweeteners, it becomes presently apparent that an immediate and pressing need exists for both new and useful sweeteners that are essentially free from the unwanted effects associated with the prior art types of sweeteners and simultaneously satisfy the inherent needs of both animals and humans.

OBJECTS OF THE INVENTION

Accordingly, it is an immediate object of this invention to provide a novel product useful as a sweetener, which product overcomes the aforesaid disadvantages associated with the prior art.

Still another important object of the invention is to provide novel compositions of matter useful for producing a sensory response of sweetness in man and animals by stimulating sensory receptors without any appreciable absorption, metabolism or assimilation of the composition.

Yet still another object of the invention is to provide a nonnutritive, noncaloric acceptable chemical sweetener useful for satisfying the primary taste of sweetness and for diet control.

Still yet a further object of the invention is to provide a nonnutritive sweetener that can be orally ingested, withstand substantial metabolic digestion and be eliminated essentially intact by the host.

Still a further object of the invention is to provide a novel nonnutritive sweetener that can be used singly or in confectionaries, foods, beverages and the like.

Yet a further object of the invention is to provide a nonnutritive sweetener that can be repeatedly and continuously used in various amounts without substantial unwanted effects on the user.

Still a further object of the invention is to provide a nonnutritive sweetener that is easy and inexpensive to manufacture and has acceptable shelf life.

Yet a further object of the present invention is to provide a nonnutritive sweetener that can stimulate taste papillae without causing obesity and cavities.

Other objects, features and advantages of the invention will be apparent to those skilled in the art from the detailed description of this specification and the accompanying claims.

SUMMARY OF THE INVENTION

This invention concerns a nonnutritive sweetener comprised of a biologically active sweetening group covalently bonded to a controlling molecule that resists active and passive transport in vivo. The active sweetening group is a molecule that can stimulate a sense receptor to arouse a sweet response in an animal, human or avian. The convalent bond, or a functional equivalent thereof, is a bond that is able to withstand cleavage or rupture and it convalently bonds the active sweetening group to the controlling molecule. That is, the bond can resist cleavage or rupture in the preparation of an orally acceptable substance and it can also resist metabolic rupture in a biological environment of use. The controlling molecule is a chemical group whose molecular dimensions substantially prevent the absorption of the nonnutritive sweetener comprised of the active group after ingestion by animals, humans or avians. The nonnutritive sweeteners can have varying degrees of solubility in various media and they can be admixed with foods and drugs. The nonnutritive sweeteners are not absorbed in vivo, which nonabsorption advantageously eliminates the possibilities of side effects, caloric input and the like.

DETAILED DESCRIPTION OF THE INVENTION

In accomplishing the objects, features and advantages of this invention, the invention in its broadest aspect relates to a novel compound of the following general formula: $(Am)_n C$ wherein Am is an active sweetening group $\sim$ is a covalent bond, C is a polymeric molecule, and $n$ is at least one.

The representation "Am" and the expression sweetening moiety or group as used herein generally include any chemical group that is capable of producing a sweet effect in animals including humans and avians, and can be covalently bonded to a controlling group, C, while simultaneously retaining its ability to produce a sweet effect. The sweetening group can be bonded directly or through other functionally equivalent covalent bonding moieties attached to the sweetening group that are nonessential for a sweet effect. The sweetening group can be of naturally occurring or synthetic origin and it can have a nutritive or nonnutritive value, which latter properties are not available because the sweetening group is covalently bonded to the controlling molecule. Generally, the sweetening group can be any group that causes sweetness or intensifies sweetness in an in vivo environment.

The sweetening group can be a compound comprised of the saccharose group

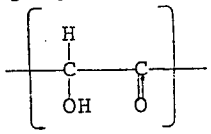

as present in carbohydrates, hydroxyaldehydes, hydroxyketones and other like compounds. The compound can contain one, or more than one, saccharose group, embracing monosaccharides, amino substituted monosaccharides and the like. Typical monosaccharides suitable for the present purpose include fructose, glucose, glycerose, therose, erythrose, methylpentose, galactose, d-mannose and the like.

The active sweetening moiety additionally includes the structurally related ols, that is, a sweetener comprised of one or more than one hydroxyl group, [OH], example, glycerol $C_3H_5(OH)_3$; mannitol $C_6H_5(OH)_6$; glycol $CH_2OHCH_2OH$; ols of the formula $RCH(OH)C:CH$ wherein R is a normal aliphatic chain such as 1-octen-3-ol $CH_2:CHCH(OH)$ $(CH_2)_4CH_3$; 3-methyl-2-hepten-4-ol $CH_3.CH:C(CH_3)CH(OH)(CH_2)_2CH_3$; 6-methyl-1-hepten-3-ol $CH=CH(OH)$ $(CH_2)_2CH$ $(CH_3)_2$ and the like mono to polyols.

The sweetening group also is comprised of known artificial sweeteners that are in themselves nonnutritive sweeteners, usually of a noncarbohydrate structure. Generally, these sweeteners do not have an insulin requirement, have little to no calorie value and they usually are not associated with dental cavities. Frequently, these artificial sweeteners are characterized by a dulcigen, glucophore or an auxogluc group that causes or intensifies sweetness. Typical compounds comprised of these groups are set forth in *Encyclopedia of Chemical Techology*, Vol. 19, Sec. Ed., pages 593 to 607, 1969, published by John Wiley & Sons Inc., wherein the dulcin group

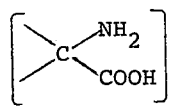

the glucophore group

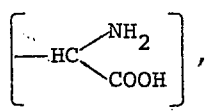

and the auxogluc group

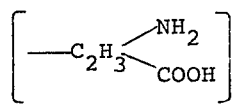

are in integral part of the artificial sweetener. Other groups that impart sweetness to an artificial sweetener are the sapophore group such as $—COCHOH$; $—CH_2OHCHOC—$; $—NH_2CH(HO)CH_2—$; $—CH_2ONO_2$; $—NHSO_3$; $C_nH_{2n+1}O_n$;

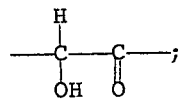

$—CH_2CONH—$: and the like. These groups, and similar groups are disclosed in *The Chemical Senses by Moncrieft, R. W., Chapter* 11, pages 486 to 543, 1967, published by the Chemical Rubber Co., Cleveland, Ohio. The above group can be integrally formed in a compound or bonded to an aliphatic, aromatic heterocyclic, cycloaliphatic, fused ring, and like compounds.

Exemplary artificial sweeteners suitable for the purpose of the invention include α-dimethylurea

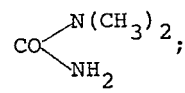

α-diethylurea

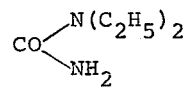

γ-methylaminobutyric acid $CH_3NHCH_2(CH_2)_2COOH$; saccharin

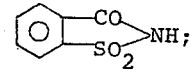

p-toluonitrile p-$CH_3C_6H_4CN$; m-tolyldioxamic acid

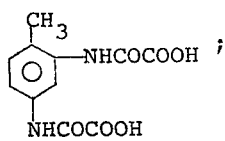

p-tolylurea p-$CH_3CH_6H_4NHCONH_2$; dulcin

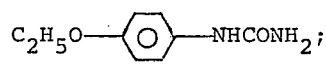

o-hydroxyphenylurea

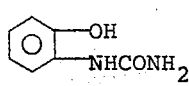

and other compounds having a nitrogen atom such as aspartylphenylalanine methyl ester

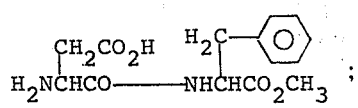

leucine (CH$_3$)$_2$CHCH$_2$CHNH$_2$COOH; active agents such as monellin including the sweet parts and derivatives thereof, *Biochem. Biophys. Acta.*, Vol. 261, pages 114 to 122, 1972; and in other nitrogenous compounds such as amides and amines optionally substituted with hydroxyl, alkyl and like groups having a sweet gustatory effect.

The artificial sweeteners also include sweeteners substituted with an alkoxy group that often can function as a means for coupling the sweetener to the controlling group. These componds typically include p-methoxybenzonitrile p-CH$_3$OC$_6$H$_4$CN; p-methoxyphenylurea p-CH$_3$OC$_6$H$_4$NHCONH$_2$; guiacol O—CH$_3$OC$_6$H$_4$OH; p-ethoxyphenylurea p-C$_2$H$_5$OC$_6$H$_4$NHCONH$_2$; p-methoxyphenylurea p-CH$_3$OC$_6$H$_4$NHCONH$_2$; p-propoxyphenylurea-p-C$_3$H$_7$OC$_6$H$_4$NHCONH$_6$; and the like. The artificial sweeteners further embrace sweeteners contacting a nitro group such as 2-nitro-3-hydroxyphenol

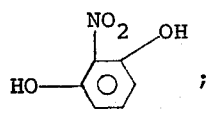

nitrohydroquinone

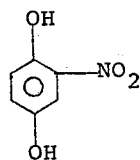

nitroparaffins such as nitroethane C$_2$H$_5$NO$_2$; nitropentane C$_5$H$_{11}$NO$_2$; 1,1-dinitroethane; 1,1-dinitropropane and the like. Typical active sweeteners comprise those having an amino group such as p-aminobenzonitrile NH$_2$C$_6$H$_4$CN; p-aminosaccharine

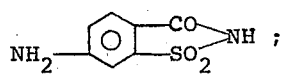

p-nitro-dulcin

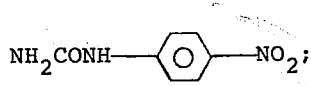

and the like. Sweeteners classifiable as nitroaromatic amines such as

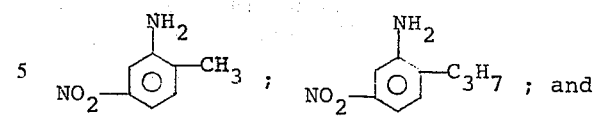

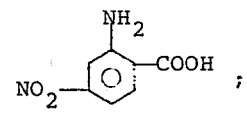

the 4nitro-2-aminophenylalkyl ethers of the formula

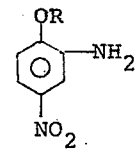

wherein R is lower alkyl such as 4-nitro-2-aminophenylpropyl ether

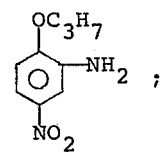

4-nitro-2-aminophenylmethyl ether

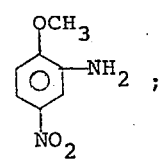

4-nitro-2-aminophenylethyl ether

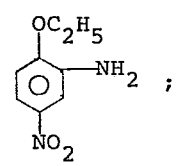

4-nitro-2-aminophenylbutyl ether

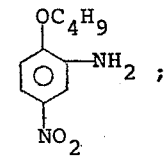

5-nitro-2-haloanilines such as

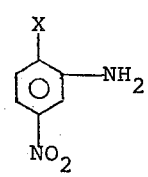

wherein X is fluorine, chlorine, bromine or iodine; and the like.

Exemplary sweeteners included in Am are the aliphatic sweeteners having an amide R—CONH₂, hydrazide R—CONHNH₂ or urea R—NHCOHN₂ group such as alkylhalomalonamides of the general formula

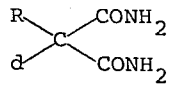

wherein R is methyl, ethyl, propyl, pentyl, or hexyl and d represents a halogen; dihydrazides of the formula

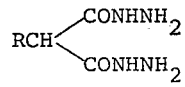

wherein R is methyl, ethyl, propyl or isopropyl; carbodihydrazide

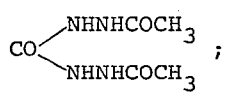

malic dihydrazide

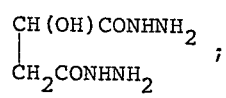

α-dimethyl urea

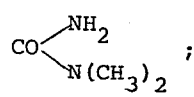

α-diethylurea

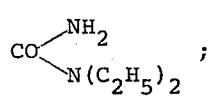

and like nitrogen sweeteners such as the oximes of the dihydroxyacetone-oxime type, such as (CH₂OH)₂C=NOH; glucose oxime O₅H₁₁C₆=N—OH; betaines such as

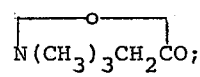

α-homobetaine

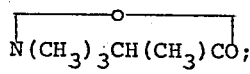

pyridine compounds such as 3,5-dihydroxypyridine; and similar type compounds wherein an —OH group or its equivalent functions like a sweetening ol group is used to impart a sweet taste to the parent compound.

The artifical sweetener Am also is comprised of halogenated aliphatics such as 1,1,2,2-tetrachloroethane, CHCl₂CHCl₂; 1,1,2,3-tetrachloropropane CHCl₂CHClCH₂Cl; pentachlorethane CCl₃CHCL₂; bis-dichloromethyl ether CHCL₂OCHCL₂; aromatics and heterocyclics having a sulfur atom such as saccharin

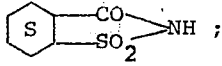

thiazole carboxylic esters, xanthic esters, sulphonic esters of triazines, illustrated by 4-methylthiazole-5-carboxylic ester

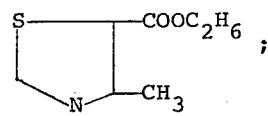

2-chloro,2-bromo, and 2-iodo-4-methylthiazole-5-carboxylic esters

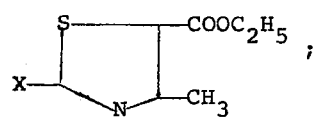

the methyl ester of xanthic acid C₂H₅OCS.SCH₃; the sodium salt of 4-methyl-2-thiazolysulphamic acid

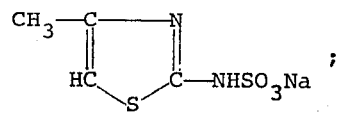

2-thiazolyl-sulphamic acid sodium salt

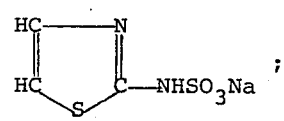

p-methylsaccharin

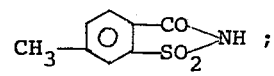

p-fluorosaccharin

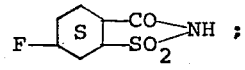

p-aminosaccharin p-sulphaminosaccharin

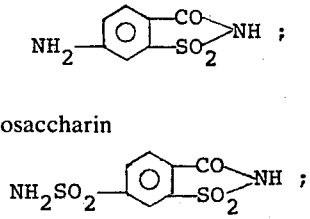

hydroxylamino saccharin

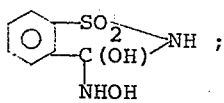

and the like. Also, sweeteners having a sulfur functionality such as sodium cyclohexylsulfamate

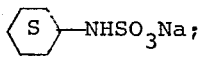

calcium cyclohexylsulfamate

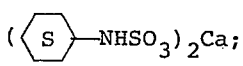

cyclamic acid

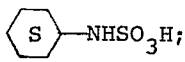

3-methylcyclopentytsulfamate

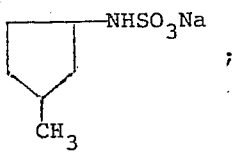

3-hexylcyclopentylsulfamate sodium salt;

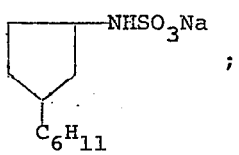

and other art known like sweeteners.

The group Am presently comprehends the dihydrochalcones of the formula

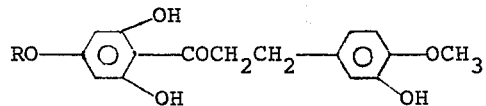

wherein R is neohesperidosyl or β-d-glucosyl; the α-tetrazolyl-6-substituted-tryptamine and α-tetrazolyl-5,6-disubstituted-tryptamine of the formula

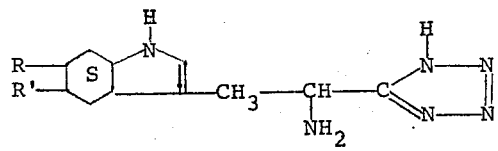

wherein R and R' are halogen, lower alkyl, lower alkoxy, -trifluoromethyl, or hydrogen; the dipeptides aspartyltyrosine methyl ester, aspartylmethionine methyl ester, and similar peptides of the general formula RO₂CCH(CH₂R₁)NHCOCH(NH₂) CH₂CO₂H where R is alkyl of $C_{1-7}$'$R_1$ is phenyl or cyclohexyl, the alkyl esters, and the like; sweeteners such as glycyrrhizin, stevioside and the like.

The graphic expression ∼ as used for the purpose of the invention broadly includes a covalent bond or a covalent bonding group that effectively joins the reactive sweetening Am group to a C moiety to form the novel, nonnutritive sweetener compounds (AM)ₙ C wherein n is at least one, and usually from 1 to 10,000 or higher. Generally, the covalent bond or its functional equivalent as used herein includes any bond that can couple the biologically active sweetener Am to C. Generally, for an Am group there is at least one covalent bond; and, the invention also includes embodiments comprised of an active Am group covalently bonded through more than one position on the group to at least one position on C. The covalent bond is a bond or the equivalent thereof that substantially resists rupture, when admixed into assorted items of commerce, can resist thermal rupture at in vivo, baking and culinary temperatures, and can essentially resist acidic hydrolysis and enzymatic cleavage during passage of the compound through the gastrointestinal tract of animals including humans, and also avians. That is, the nonnutritive sweeteners of the invention are able to maintain their physico-chemical integrity for a prolonged period of time. By prolonged period of time is meant the time in storage and manufacturing process times needed in preparing various commodities and the time required to pass through the gastrointestinal tract of the user. Typically, such periods of time may vary from 1 hour to 3 years or longer. The sweetening group Am is joined by the covalent bond or its equivalent to at least one position on C through at least one position or substituent on the sweetening group that substantially does not interfere with its sweetening properties. The C group of the sweetening compound (Am)ₙ C, as will be fully discussed later in this disclosure, is a controlling group that has a molecular shape or molecular weight and shape that substantially prevents in vivo absorption of itself and the Am group as covalently bonded thereto. Thus, the sweetener (Am)ₙ C of this invention is essentially nonabsorbed, and essentially nonassimilated in its passage through the gastrointestinal tract of the user.

Generically, the bonding expression ∼ includes a member selected from the group consisting of a single covalent bond, a straight chain divalent alkylene bridge $-(CH_2)_{\overline{n}}$ wherein n is 1 to 18, a branched or a substituted divalent alkylene bridge of the formula $-(CR_1R_2)_{\overline{y}}$ wherein $R_1$ and $R_2$ are the same or different and they are selected from the group consisting of hydrogen, lower alkyl, lower alkoxy, lower alkenyl, hydroxyl, acyl and halogen with the proviso that at least one of $R_1$ and $R_2$ or both are other than hydrogen and are the same or different, and y is 1 to 12 and the same or different, a lower alkenyl bridge —CH=CH—, a lower alkyne —C ≡ C—, an oxa linkage —O—, a carbonyldioxy

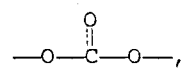

an acyl linkage

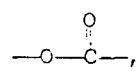

an amide function

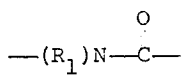

wherein $R_1$ is the same as $R_1$ and $R_2$ above, an azo linkage —N=N—, an alkylenedioxy of the formula —O$(CR_1R_2)_y$O— wherein $y$ is as defined, and $R_1 = R_2 =$ hydrogen or any of the above as defined for $R_1$ and $R_2$; and alkenyldioxy bridge —O$(-CH=CH-)_z$O—; an alkyleneoxa linkage —O$(-CR_1R_2)_y$ wherein $z$ is 1 to 4, a straight chain azalkylene

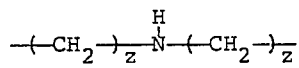

as well as $(-CH_2-)-N=CH(-CH_2)_2-$; a thialkylene $(-CH_2-)_z S(-CH_2-)_z$, and oxidized forms thereof such as sulfoxide and sulfone, and oxalkylene $(-CH_2-)_z O(-CH_2-)_z$, a bivalent aromatic radical such as arylene

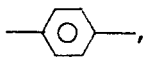

a bivalent aralkylene

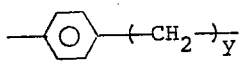

or

a divalent cycloalkylene

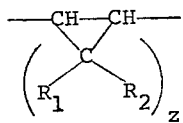

$R_1$ and $R_2$ are the same or different and are selected form hydrogen and as above defined and $z$ is 1 to 4, an alkylene oxide

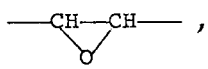

a divalent five or six membered heterocyclic radical wherein the radical is a thiacyclic, an oxacyclic or a monazacyclic, a diazacyclic or a triazacyclid radical that can be optionally substituted or unsubstituted, and the like covalent bonding functions. Additionally, the invention embraces combinations and mixtures of the above bonding expressions.

Typical of the straight chain divalent alkylene $(-CH_2)_n$ radical wherein $n$ is 1 to 18 suitable for the purpose of the invention as embraced in the above general formula includes methylene, ethylene, propylene, butylene, hexamethylene, octamethylene, nonomethylene, decamethylene, undecamethylene, dodecamethylene, tetradecamethylene, hexadecamethylene, heptadecamethylene, and octadecamethylene. Representative of lower alkyl groups substituted on an alkylene bond include lower alkyl groups of 1 to 7 carbons include the straight and branched chain alkyl groups such as methyl, ethyl, n-propyl, n-butyl, n-amyl, isopropyl, isobutyl, t-butyl, sec-butyl, isoamyl, t-amyl, isohexyl, and the like. Exemplary lower alkenyl of 1 to 7 carbon atoms include ethenyl, 1-propenyl, allyl, 1-butenyl, 3-butenyl and the corresponding isomers thereof, such as 1-isobutenyl, 1-sec-butenyl, 1-pentenyl, 2-methyl-1-butenyl, 1,1-dimethyl-2-propenyl and the like. Representative lower alkoxy groups include lower alkoxy groups of 1 to 7 carbon atoms including methoxy, ethoxy, isopropoxy, butoxy, and the like.

Typical divalent bonding alkylene groups $(-CR_1R_2)_y$ substituted with the above substituents include 1,1-dimethylmethylene, 1,1-dimethylethylene, 2-methylpropylene, 1-methoxymethylene, 2-ethoxypropylene, 3-methoxyhexamethylene, 4-isopropyloctylene, 2-allylpropylene, 2-butenyl-1-butylene and the like. Representatvie of alkenyl divalent groups include those having 2 to 7 carbon atoms such as 1-propenylene, 2-butenylene, 2-pentenylene, 2-propenylene, 2-methyl-2-butenylene, ethylene, 1-heptenylene and the like. Representative of lower alkyne divalent bonding groups of 2 to 7 carbon atoms include ethynylene, 2-propynylene, 2-pentene-4-ynylene, 2-butynylene, 2-pentenediylidyne and the like.

The term alkylenedioxy as a divalent linkage as used herein includes the groups methylenedioxy, ethylenedioxy, propylenedioxy, butylenedioxy, hexylenedioxy and the like. The term alkenyldioxy includes ethenylenedioxy, 1-propenylenedioxy, 2-propenylenedioxy, isopropenylenedioxy, 1-butenylenedioxy and the like. Representative of azalkylene, thiaalkylene and oxalkylene include symmetrical or (syn) and unsymmetrical or (unsyn) azalkylenes, thiaalkylenes and oxalkylenes such as syn-azadimethylene, syn-azadiethylene, syn-azadipropylene, syn-thiadiethylene, syn-thiadipropylene, syn-oxadimethylene, unsyn-oxamethylethylene and the like. Typical examples of arylene and aralkylene include phenylene, syn-phenyldimethylene, syn-phenyldiethylene, syn-phenylisopropylene and the like.

The term divalent cycloalkylene as used herein includes lower cycloalkyl radicals having 3 to 7 ring carbon atoms as illustrated by disubstituted cyclopropylene, cyclobutylene, cyclopentylene, cyclohexylene, cycloheptylene and the like. Representative of alkylene oxides are ethylene oxide and propylene oxide.

The expression "a divalent five or six membered heterocyclic radical having an oxa, aza or thia member" includes heterocyclic radicals having two positions suitable for forming covalent bonds, wherein one position covalently bonds with the Am moiety and the other covalently bonds to the C moiety. Exemplary of hetero radicals are 2,5-thiazolyl, 3,4-furyl, 1,4-pyrazinyl, 3,4-pyrrolyl, 3,5-pyranyl, 3,5-piperidyl, 3,4-pyrazolidnyl, and the like. These and other covalent bonding groups that essentially maintain their original bonding integrity in vitro or in vivo atmosphere can be used for the purpose of the invention. The covalent bonding group also includes those groups that maintain their bondality, even with various substituents attached to the parent group. This includes substituents that may be altered, changed or reacted with other groups in the environment of use so long as the covalent bond between Am and C maintains its physical and chemical integrity for a prolonged period of time.

The group C as used for the purpose of the present invention comprises a moiety that has Am covalently bonded thereto. In operation, C serves to both confine Am in a commodity and to transport it through the gastrointestinal tract of animals, humans or avians without any substantial absorption of C or of Am. The group C can be classified as a controlling group or a controller molecule because its dimensions, in size or shape or both, restrict the movement of $(Am)_n C$ across the wall of the digestive tract. That is, C's chemical structure and dimensions essentially prevent active or passive absorption of Am through the gastrointestinal wall into the systemic circulation so that Am is always external to the body even when $(Am)_n C$ is present in the gastrointestinal tract.

Group C can be naturally occurring or synthetic and it is preferably a material that maintains its physical and chemical integrity in the environment of use. That is, it is essentially nonmetabolizable, nonbiodegradable, indigestible and the like in the gastrointestinal tract. Group C can have either hydrophilic or hydrophobic properties. The nonnutritive sweetener $(Am)_n C$ including C can also be substituted with conventional groups that impart to the nonnutritive sweetener degrees of aqueous or lipid solubilities to accommodate the presence in an assortment of edible commodities and in the environment of use. Generally, C includes any chemical moiety that can withstand digestion or prevent absorption of the sweetening group and the entire nonnutritive sweetener by biological absorption mechanisms, such as passive transport, osmosis, active transport including pinocytosis and phagocytosis. Generally, C is comprised of at least one three dimensional space occupying group, that is, having at least one nonplanar atom or other group with dimensions such that the total molecular volume of C in any one of its three dimensions substantially restricts its movement from the mucosal to the serosal side of the digestive tract in humans. That is, the space occupied by C is always sufficiently larger than the transport pathways of a human intestine. The pathways in farm animals including sheep, cows, steers and other farm animals are similar to humans and for those animals an operable restricting group should be larger than their pathway. This embodiment of the invention substantially prevents absorption of the active molecule into the systemic system and also eliminates the likelihood of caloric imput and unwanted toxicity form any component of the compound. The controlling molecule C should have a molecular weight in excess of 400 with a presently preferred molecular weight in excess of 1,000, usually in the range of 15,000 to 500,000 to substantially prevent any penetration into cells, microvilli, pores and the like. The nonnutritive sweeteners prepared according to the mode and manner of the invention having a molecular weight in excess of 1,000 have essentially a zero movement rate from the mucosal to serosal side.

Exemplary materials suitable for use as the controller molecule C include polymeric and polymeric like materials of naturally occurring and synthetic origin, and materials fabricated of the Am moiety itself. When Am is also C it can have a polymeric form such as its oligomer, as the dimer, trimer, tetramer, heptamer, octamer and the like. These materials comprising C can have a linear or branched structure, they can be cross-linked, and substituted or unsubstituted. The materials suitable for the present purpose are essentially indigestible for a prolonged period of time, that is, for a time sufficient to pass through the gastrointestinal tract of the user, generally about 11 hours or less to 24 hours or longer. Generically, the natural polymeric and oligomeric materials include exudates from vegetation, seed extractives, seaweed products, polymers of animal origin and the like. Generically, the synthetic polymeric and oligomeric materials include homopolymers and copolymers synthesized by condensation polymerization, addition polymerization, including free radical polymerization, and like techniques.

Exemplary of polymeric materials suitable for the present puproses include the commercially available celluloses conventionally produced by reacting cellulose with an alkali to yield an alkali cellulose, by reacting an alkali cellulose with an alkyl halide to yield a alkylcellulose, by reacting an alkali cellulose with an alkylene oxide to yield a hydroxyalkylcellulose, and the like. Typical cellulose polymers resistant to depolymerization or degradation include methylcellulose, hydroxypropyl-methylcellulose, ethylcellulose, ethylhydroxyethylcellulose, ethylmethylcellulose, hydroxyethylcellulose, hydroxethylmethylcellulose, sodium carboxymethylcellulose, sodium carboxymethylhydroxyethylcellulose, and the like. Typical naturally occurring products include agar-agar, agarose, algin and alginates, propyleneglycol alginates, sodium alginate, Irish moss, fucoidan, acylated fucoidan, laminaian, hypnean, furcellaran, iridophycan, gum tragacanth, corn hull gum, dextran and like natural products. Exemplary synthetic polymeric materials suitable for the purpose of the present invention include carboxyvinylpolymers, poly(vinylalcohol), poly(ethylene glycol), poly(propylene glycol), poly(ethylene oxide), poly(ethylene sorbitan tristerate), poly(vinylpyrrolidone), polysorbate and other polymeric materials that are metabolized only after a prolonged period of time, generally a year or more. Representative of the latter polymers include polyacrylamides, modified polyacrylamides, acrylamide-acrylic acid co-polymers, cross-linked, nonbiodegradable polymeric polyacrylamides, and the like. Exemplary of $(Am)_n C$ when Am is C is an oligomeric material comprised of at least one Am group covalently bonded to one or more like or unlike Am groups to form an oligomer of the general formula $Am(Am)_pAm$ wherein $p$ is 0 to 15,000 and Am is any of the active groups described supra. The materials for either of the above, that is, a polymeric or oligomeric material can be used in the form of acceptable derivatives such as ethers, esters, acid addition salts, amides and the like that lend themselves to controlling the solubility of the material for enhancing the use of the compound in both the user and in commercial articles of manufacture.

The compounds of the invention $(Am)_n C$ can be synthesized by conventional methods well known to the art. Generally, the group Am is covalently bonded through any position or substituting group on Am that does not essentially interfere with its ability to produce a sweet effect to a functional group on C. The conventional methods suitable for synthesizing the novel and useful compound includes nucleophilic substitution or displacement reactions of the following general equations (a) $R-\overset{-+}{OM} + R'X \rightarrow R-O-R' + \overset{-+}{XM}$ wherein R is a polymeric backbone, M is a cation, R' is a sweetening moiety and X is a leaving group. Optionally, the reverse conditions wherein R is a sweetening group and R' is a polymeric type reactant can also be used to synthesize the product. The nucleophilic substitution also includes the general equation (b),

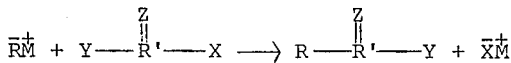

wherein R is a polymeric reactant, M is a cation, R' is a sweetening group, Y is any substituent, Z is a hetero atom and X is a leaving group. As above, the nucleophilic substitution also includes the reverse conditions thereof.

The compounds of the invention can also be synthesized by nucleophilic addition or coupling reactions such as (a)

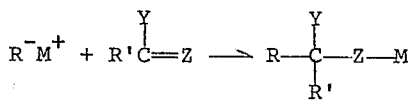

wherein R is a polymer, M is a cation, R' is a sweetener, Y is any substituent such as hydrogen, alkyl and the like and Z is a hetero atom such as oxygen, nitrogen or sulfur, and by the addition reaction (b)

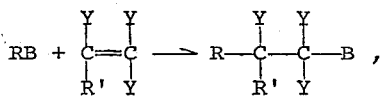

wherein the groups are as defined except that B is a functional group containing a partial change and is optionally associated with R, and wherein optionally the reverse reaction conditions can be used to yield the product.

The product can also be synthesized by electrophilic and related addition or coupling reactions such as

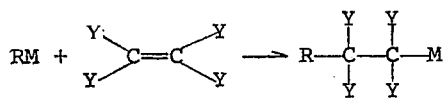

and

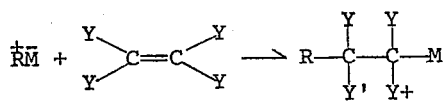

in a single stage or two stage reaction wherein the terms are as defined and M is now an anion, and by electrophilic substitution or displacement reactions such as

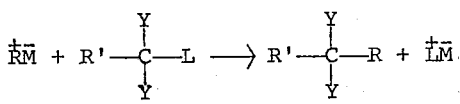

wherein the terms are as defined. These methods of synthesis are described in *Organic Chemistry* by Cram, D. J. and Hammond, G. A., Second Edition, Chapters 13, 15 and 17 through 20, 1964, published by McGraw-Hill Co., New York. Another operable method suitable for the present invention is the free radical coupling reaction. This method is comprised of irradiating a high molecular weight organic polymeric material having hydrogen atoms with ultra violet light for a period of time sufficient to form a reactive center and simultaneously contacting and polymer with an unsaturated sweetening compound having a reactive site to form the desired product.

Typical examples for bonding the biologically active sweetener group to the polymeric structure include reacting a sweetener having a hydroxyl or amino group with a cyanogen halide and with a polymer having similar functional groups under mild alkaline conditions at 0° to 50°C for a time sufficient to yield the desired product. Another method is comprised of exposing a polymer to beta or gamma rays, accelerated particles or the like to form active centers such as on cellulose or the like, to which center an active sweetener moiety becomes bonded thereto. Another representative method for forming the compound is comprised of reacting a synthetic polymer such as dextran with a halogen substituted triazinyl compound that reacts with the polymer and also has a nucleophilic substituent that can react to form a covalent bond with the sweetener. Additionally, the sweetener can be bonded to the polymer by conventional processes such as diazotization, by reacting an acyl halide, a carboxyl, or anhydride group of a polymer with an amino, hydroxyl or sulfhydryl group of a sweetener in aqueous buffer media, inert organic or mixed solvents, by introducing oxirane groups into hydrophilic polymers such as the polysaccharides agarose, cellulose, sephadex, or dextran, cross-linked polyhydric alcohols, soluble and nondegradable polyacrylic acids, polyacrylamides, or their derivatives and then coupling the now activated polymers with a biologically active sweetener having at least one reactive amino, imino, alcoholic, alkoxy, alkenyl or other functionality to produce the products of the invention wherein the sweetener retains its original activity completely or in part.

The covalent attachment of the sweetener to the polymer can also be effected by the reaction of an alkoxide anion, either as a functionality of the sweetener molecule or the polymer reactant with an oxirane ring or leaving group such as a toluenesulfonate ester, which latter groups are part of the other reactant. Specifically, these methods comprise reacting the alkoxide anion functionality of the polymer with the oxirane ring or leaving group on the sweetener molecule or conversely by reacting the alkoxide anion functionality of the sweetener with the oxirane ring or leaving group of the polymer. The compound can also be synthesized by the combination of a 1,3-diol or 1,2-diol with an aldehyde, (acetalization) or ketone, (ketalization) wherein the diol function can be part of the sweetener or polymer and the aldehyde or ketone functionality part of the alternate reactant. Other means for forming covalent bonds such as thioesters, disulfides, amides, imides, esters and the like can be readily formed, for example, by reacting a pendant carboxyl group of a sweetener with a hydroxyl, amine, mercaptan group or the like on the other reactant, wherein activation of a carboxyl group can be effected by the reaction of the carboxyl group with various carbodiimides, carbodimidazoles, Woodward's reagent and the like to form highly active intermediates capable of reacting with other groups mentioned above in the presence of a solvent and under mild reaction conditions to yield the desired compounds.

An alternative procedure for preparing $(Am)_n C$ consists in using Am as a monomer which can be copolymerized with a different monomer to yield a nonabsorbable copolymer in which the Am moiety functions as a sweetening agent, while remaining an integral part of the copolymer.

In another embodiment, the nonnutritive sweetener can be synthesized as an oligomer comprised of individual Am moieties covalently bonded to each other thusly Am $(Am)_p$ Am wherein $p$ is 0 to 15,000. In this embodiment at least one or all of the Am moieties can produce a sweetening effect while simultaneously remaining an integral component of the oligomer. In the above formula, Am is as previously described.

Exemplary solvents, in their broadest context, are those suitable for use as a media for coupling the biologically active sweetening group to the polymer either directly or indirectly through use of an activating agent without adversely affecting the sweetening group or the polymer. The solvent used by those versed in the art in the light of the specification can be an inorganic, organic or mixed solvent, such as water, organic solvents in combination with water, an aqueous buffer, organic solvents such as halogenated solvents like methylene chloride, chloroform and ethylene dichloride, and other solvents such as pyridine, tetrahydrofuran, dioxane, diethylether, dimethylether, benzene dimethylsulfoxide, methylene dichloride, carbon tetrachloride, cyclopentane, cyclooctane, n-hexane, n-heptane, isobutyl ketone, dimethylforamamide, ether-benzene mixtures and the like. The amount of solvent used is an amount sufficient to partially or completely solvate interacted sites of the reactants and thus enhance the ability of the preselected functional group to react and produce the product.

The reaction conditions used for synthesizing the desired products and intermediate compounds used for producing the desired products are conventional reaction conditions. These reactions are usually carried out by intimately contacting and reacting the reactants optionally in the presence of a solvent for a time sufficient for them to react, usually about 15 minutes to 96 hours or longer at reaction temperatures of about 0°C or less to 200°C or higher and usually at room temperature of about 25°C or at slightly elevated temperatures. Generally, stoichiometric amounts or an excess thereof of the reactants are reacted under normal atmospheric pressure or at pressures up to 10 atmospheres to produce from the starting reactants the corresponding products. The product is recovered from the reaction vessel by procedures such as the evaporation of the aqueous or organic solvents, by the addition of miscible solvents of low polarity, by chilling the mixture to precipitate the product, and the like.

Representative of acid catalysts suitable for performing the reaction when required herein are p-toluenesulfonic acid, hydrochloric acid, anhydrous hydrobromic acid, Lewis acids such as aluminum chloride, boron triflouride, boron trichloride etherate, boron trifluoride etherate, stannic oxychloride, phosphorous oxychloride, phosphorous pentachloride, zinc chloride, zinc oxide and the like.

The ester derivative of a carboxyl group on a sweetening group or on a polymer is obtained by standard chemical techniques that consist of reacting a carboxyl group with a solution containing a diazoalkane or the like to produce the ester. Esterification of the acid group is performed by reacting the group with a diazoalkane, for example, diazomethane, diazoethane, diazopropane, diazobutane, etc., in an inert organic solvent, for example symmetrical and unsymmetrical ethers, halogenated solvents or mixtures thereof. The esterification reaction is usually performed at a temperature of 0° to 75°C, usually at room temperature and atmospheric pressure, with the ester recovered by evaporation of the solvent and like techniques. The esterification reaction is described in *Organic Chemistry*, by Fieser and Fieser, pages 180 to 181, 1944.

The compounds of the invention bearing a basic group, such as amino or the like, can be converted to non-toxic acid addition salts having improved aqueous solubility. Although non-toxic salts are prepared, any salt may be prepared for use as an intermediate as in the preparation of another but non-toxic acid addition salt. The free basic group can be conveniently converted to the acid addition salt by reacting the base with the selected acid, for example, an alkyl, cycloalkyl, alkenyl, cycloalkenyl or aralkyl halide sulfate or sulfonate, preferably in the presence of an organic solvent inert to the reactants and reaction products. The acids which can be used to prepare the preferred non-toxic acid addition salts are those derived from mineral acids such as hydrochloric, hydrobromic, hydroiodic, nitric, sulfuric, phosphoric, acetic citric, lactic, fumaric, tartaric, and the like. The acid addition salts are prepared either by dissolving the free base in an aqueous solution containing the appropriate acid and isolating the salt by evaporating the solution, or by reacting the free base and the selected acid in an organic solvent, in which case the salt ordinarily separates directly or can be conventionally recovered by concentration of the solution or the like.

The nonnutritive sweeteners and intermediates used to prepare these when bearing a carboxyl functionality can also be used in the form of their base addition salt that have improved solubilities in water. These salts include alkali metal and alkaline earth bases such as sodium, potassium, calcium, copper and magnesium, the hydroxides and carbonates thereof, the ammonium salts and substituted ammonium salts, salts of alkyl amines such as triethylamine, trimethylamine, triisopropylamine, methylcyclohexylamine, N-(lower)alkyl piperidines and the like. Also, salts formed from compounds like tetra-alkylammonium hydroxides which are known as quaternary ammonium salts. The salts are prepared by procedures known to the art, for example, equivalent or stoichiometric amounts of the free carboxyl compound and the organic base are dissolved in an inert organic solvent and warming the solvent with gentle mixing of the reactants. The product or salt is then obtained by chilling the resulting mixture to precipitate the salt, powder or crystals that can be recovered by the addition of a miscible diluent of low polarity, or by the use of standard evaporation techniques. The formation of the inorganic salts is also carried out by procedures known to the art; for example, the free carboxyl group is first dissolved in a solution containing stoichiometric amounts or an excess amount of a salt forming inorganic hydroxide, carbonate or the like.

The reaction is carried out in a solvent and the product obtained by procedures such as the evaporation of the solvent, by chilling to precipitate the product and like techniques.

The solubilities of the nonnutritive sweetener, or of intermediates leading thereto, can be regulated by acylating the free hydroxyl group of the sweetener or the polymer or both. Exemplary of acyl derivatives of the hydroxyl group are acyls having 1 to 18 carbons such as alkanoyl, alkenoyl, aroyl, and the like. Typical alkanoyl groups include formyl, valeryl, acetyl, propionyl, heptanoyl, octanoyl, undecanoyl, lauroyl, palmitoyl, stearoyl, oleoyl, isomeric forms thereof and the like; typical alkenoyl groups include acryloyl, methacryloyl, crotonyl, 3-butenyl, β-methyl-α-butenoyl, and the like; typical aroyl groups are benzoyl, phenylacetyl, cinnamoyl, naphthoyl, p-exhoxybenzyl, allyoxyphenylacetyl, and the like. Exemplary of other acyl moieties within the scope of the invention are carboxacyl moieties such as cyclohexanecarbonyl, 3-cyclohexanecarbonyl, p-chlorophenoxyacetyl, succinyl, p-nitrobenzoyl, furoyl, 3-pyridine carbonyl, and the like.

The acylation is advantageously carried out by mixing the free hydroxyl compound with an acid anhydride usually in the presence of an amine solvent. A substantial excess of anhydride should be used, preferably about 10 moles of anhydride per mole of hydroxy compound reactant. The excess anhydride serves as a reaction diluent and solvent. The reaction is preferably carried out in the range of about 0° to 75°C, or higher, usually from 10 minutes to 36 hours. The acylated product is isolated from the reaction by conventional methods. For example, the excess anhydride can be decomposed with water, and the resulting mixture acidified and then extracted with a solvent, and the acrylate uncovered by evaporation. If desired, the acylate can be purified by conventional methods, such as chromatography.

Examples of suitable anhydrides are acetic anhydride, propionic anhydride, butyric anhydride, acrylic anhydride, crotonic anhydride, benzoic anhydride, and the like. Optionally, suitable acid halids can also be used, such as acetyl chloride, propionyl chloride, butyryl chloride, isobutyryl chloride, succinyl chloride, furoyl chloride, and the like.

The hydroxyl group attached to the nonnutritive sweetener can be etherified to form ether derivatives that have desirable solubilities in various media. One method of preparing the ether is comprised of contacting a free hydroxyl group with an alkali hydroxide in an organic solvent to form the alkoxide. The alkoxide is then contacted with an alkyl iodide yielding the corresponding alkyl ether. Generally, the reaction is carried out at 25° to 150°C for about 15 minutes to 24 hours and optionally with a catalyst such as cuprous chloride to quicken the reaction. The ether is recovered from the reaction medium by standard techniques such as extraction, evaporation, etc. Typical of the alkyl iodides suitable for the reaction include ethyl iodide, isopropyl iodide, cyclohexylmethyl iodide, methyl iodide, 1-butyl iodide, and the like.

The following examples are set forth as representative methods illustrative of the spirit of the present invention. These examples are not to be construed as limiting the scope of the invention as other functionally equivalent means will be readily apparent to those skilled in the subject art.

EXAMPLE 1

The covalent bonding of a sweetening group to a polymeric material is illustrated as follows: first, 1-chloro-2,4-dinitrobenzene (I) is reacted with 2-hydroxyethylether (II) in the presence of an alkali, NaOH, to yield the corresponding product 1-(2'-hydroxyethoxy)-2,4-dinitrobenzene (III). This latter compound is then reduced with sodium disulfide to form the ortho and para isomers (IV and V) which are separated on a silica gel column. Next, 1-(2'-hydroxyethoxy)-2-amino-4-nitrobenzene is acetylated with one equivalent of acetyl chloride at room temperature to yield the corresponding 2-(2'-hydroxy-ethoxy)-5-nitroacetamide (VI), which is reacted with epichlorohydrin (VII) under mild alkali conditions (OH$^-$) to give 2-[2'-(1,2-epoxy-3-propoxy)ethoxy]-5-nitroacetanilide (VIII). This compound is then optionally reacted with poly(vinyl alcohol) in the presence of a strong base and an organic solvent such as dimethylsulfoxide or in an aqueous media to yield the nonnutritive sweetener (IX) after hydrolysis under acid conditions of the amide function to the free amine. The recovery of IX from VIII is carried out in two steps indicated as (1) and (2). The above reactions are depicted as follows wherein m is equal to or greater than n by 1.

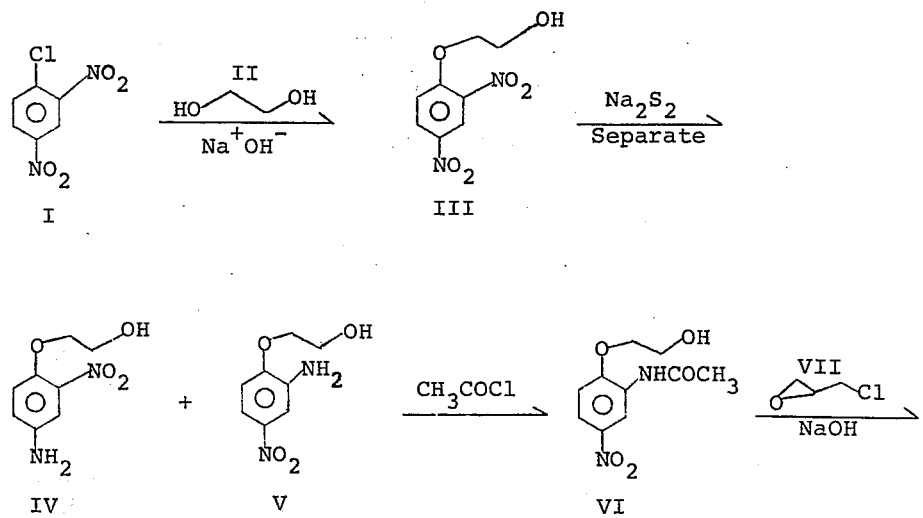

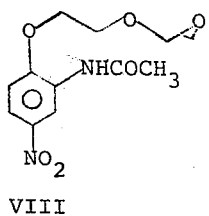

VIII

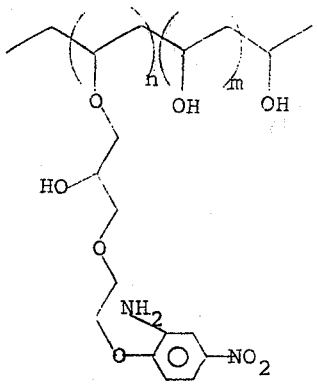

(1) PVA, n-BuLi, THF
    or
    PVA, OH⁻

(2) H₂O, H₃O⁺

IX

EXAMPLE 2

The covalent bonding of sweetening agent to a polymer to yield $(Am)_n C$ can also be carried out as follows: first 1-chloro-2,4-dinitrobenzene (I) is reacted with 2,2'-dihydroxyethyl ether (X) in the presence of OH⁻ to give 1-[2'-(2-hydroxyethoxy)ethoxy]-2,4-dinitrobenzene (XI) whose nitro groups are selectively reduced to yield 1-[2'-(2-hydroxyethoxy)ethoxy]-2-nitro-4aminobenzene and —[2'-(2-hydroxyethoxy)ethoxy]-2-amino-4-nitrobenzene, (XII). The positional isomers are separated as in Example 1, and the 2-amino position of compound XII is reacted with acetyl chloride to 1-[2'-(2-hydroxyethoxy)ethoxy]-5-nitroacetanilide (XIII). Next, the aliphatic hydroxyl group of compound XIII is esterified with p-toluenesulfonyl chloride (p-TsCl) in an organic solvent, pyridine (Py) to form the tosylate ester (XIV). The ester is then reacted with a polymer such as polyvinyl alcohol in accordance with the reaction conditions of Example 1 to yield the desired product XV after hydrolysis (aqueous acid) of the amide function to the free amine, wherein $n$ and $m$ are as previously described. The reactions are illustrated as follows:

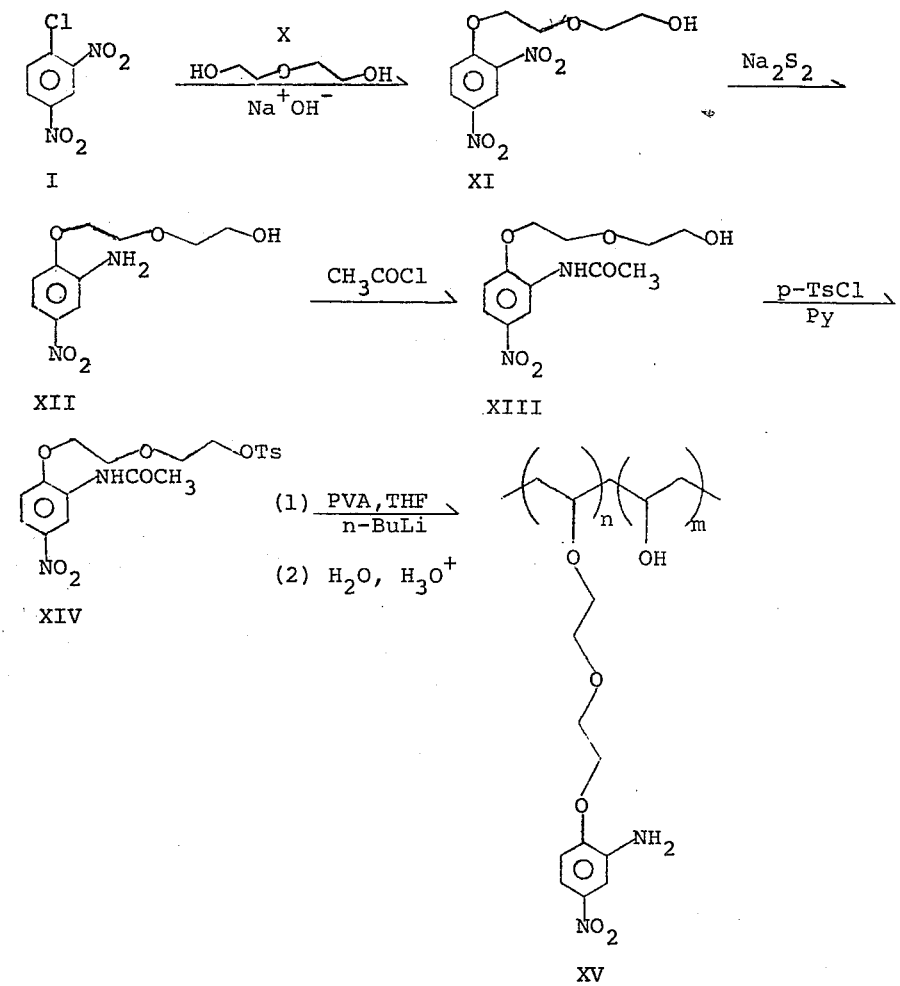

EXAMPLE 3

To 0.62 moles of commercially available 2-amino-4-nitrophenol

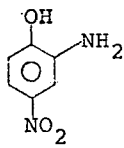

is added with continual stirring 200 ml of acetic anhydride and 700 ml of acetic acid, and the reaction mixture allowed to proceed over night at room temperature, to yield 2-acetamido-4-nitrophenol

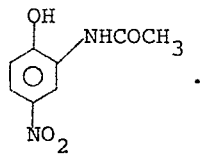

To 0.418 moles of this compound in 8.5 liters of 1 propanol is added 440 ml. of 1N NaOH and the reaction allowed to proceed at 50° to 60°C for 70 minutes to give the corresponding salt,

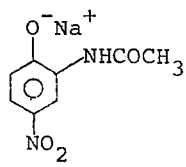

Next, 0.096 moles of this sodium salt of 2-acetamido-4-nitrophenol is mixed with 0.12 moles of 4-bromo-1-butene in 200 ml of n-propanol and the reactants refluxed for 24 hours to give 2-(but-3'-enoxy)-5-nitroacetanilide

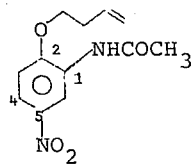

To 0.050 moles of the acetanilide is then added 0.055 moles of m-chloroperbenzoic acid

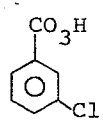

in 125 ml of methylene chloride and the reaction stirred for 50 hours at room temperature to give 2-[3,4-epoxybutanoxy]-5-nitroacetanilide,

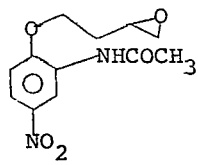

Then, 0.03 moles of the freshly prepared 2-[3,4-epoxybutanoxy]-5-nitroacetanilide is added to a mixture of 0.03 mole of dimsyl sodium,

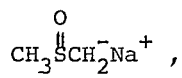

0.1 mole of polyvinyl alcohol in 200 ml of the solvent dimethylsulfoxide and the reactants auto-reacted under ambient conditions for 24 hours, to yield

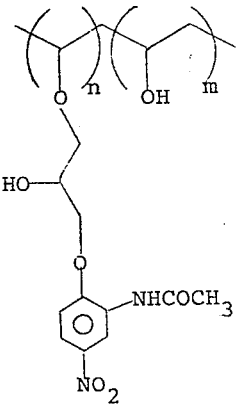

wherein $m$ is equal to or 5 times greater than $n$, and the polymer has a molecular weight of of 100 to 1,000,000. Next, the latter compound is refluxed for 1.5 hours in 500 ml of 2N H Cl to give

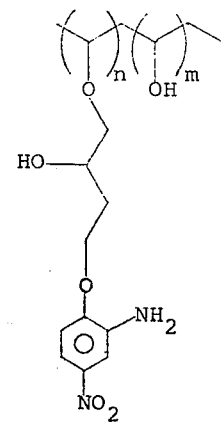

after neutralization with base. The latter compound can optionally be used as a therapeutically acceptable acid addition salt thereof, or the hydroxyl groups can be acylated to esters or they can be etherified to alkyl ethers.

EXAMPLE 4

Following the procedure as set forth in Examples 1 to 3, a novel sweetener is prepared as follows: first, 0.31 moles of 2-amino-4-nitrophenol is added to 200 ml of acetic anhydride in 700 ml of acetic acid and the reactants refluxed over night at room temperature to give 2-acetamido-4-nitrophenol. Next, 0.209 moles of the nitrophenol in 4.25 l of 1-propanol is gently mixed with 220 ml 1N NaOH and the reaction carried out with stirring at 50° to 60°C for 10 minutes to form the sodium salt of 2-acetamido-4-nitrophenol. Next, 0.048 moles of the just prepared and recovered 2-acetamido-4-nitrophenol is mixed with 0.06 moles of 3-bromo-1-propanol in 100 ml of n-propanol and the reactants refluxed for 24 hours under normal atmospheric conditions, to form 2-(3'-hydroxypropoxy)-5-nitroacetanilide, which is then reacted at 0°C for 20 hours in pyridine with 0.09 moles of p-toluenesulfonyl chloride to form the 3'-tosylate ester. The ester (0.015 moles) is added to a mixture of 0.015 mole of dimsyl sodium and 0.05 moles of polyvinyl alcohol and 100 ml of dimethylsulfoxide and the reaction carried out at room temperature for 24 hours. Then

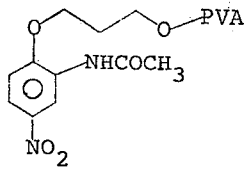

is recovered and hydrolyzed with 250 ml of 2N HCl under refluxing conditions for 1.5 hours to give

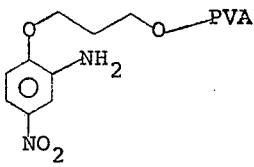

after neutralization with base wherein PVA is the polymer polyvinyl alcohol. The acid addition salts of the NH₂ functionality can also be readily prepared according to the procedure discussed supra.

EXAMPLE 5

Following the procedure of Example 1, a nonnutritive sweetener is prepared wherein a 2[2'-(1,2-epoxy-3-propoxy)-ethoxy]-5-nitroacetanilide is copolymerized with a cyclic ether, such as ethylene oxide, to yield a nonnutritive sweetener copolymerized into a polyether. The copolymerization is carried out with the aid of a Lewis acid catalyst and the opening of the cyclic ether to give the polymer. The Lewis acid can be BF₃·Et₂O, Et₂Zn–H₂O, AlCl₃ or ZnO and the ratio of the sweetener monomer to ethylene oxide can be varied from 1:1 up to 1:100, usually with ethylene oxide in excess. Finally, the sweetening monomer is subjected to acid or base catalyzed hydrolysis, with HCl or NaOH, of the amino protecting group to the free amine. The general procedure for this reaction is disclosed in *Introduction to Polymer Chemistry*, by Stille, J. K., pages 124 to 128, 1962, published by John Wiley and Sons, New York and in *Chemical Abstracts*, Vol. 71, 50660(b), 1969.

EXAMPLE 6

Following the procedure of Examples 1 and 5 but substituting for the monomeric nonnutritive sweetener of Example 5, the monomer 2-[3,4-epoxybutanoxy]-5-nitroacetanilde as prepared in Example 3, there is formed the corresponding water soluble, copolymerized nonnutritive sweetener covalently bonded to the poly(ether).

EXAMPLES 7 and 8

Repeating the procedure of Example 2, the monomer

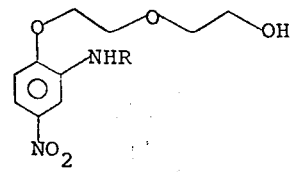

is reacted with trace amounts of p-toluenesulfonic acid

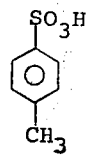

and ethyl vinyl ether at elevated temperatures in benzene with azeotropic distillation of ethanol to yield

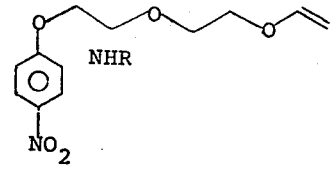

wherein R is a protecting group. The monomer is next optionally copolymerized with maleic anhydride or with N-vinylpyrrolidone in an organic solvent to yield the corresponding copolymer, followed by acid, as HCl, or base, as NaOH, hydrolysis of the amino protecting group to the free amino group. Polymerization reactions of this type are described in *Chemical Abstracts*, Vol. 65, page 10672e, 1966.

EXAMPLE 9

Preparation of a nonnutritive sweetener comprised of ortho-benzosulfinimide covalently bonded to agarose, a commercially available polymer composed of alternating 1-3 linked β-D-galacto-pyranose and 1-4 linked 3,6-anhydro-α-L-galactopyranose units as described in *Methods in Carbohydrate Chemistry*, Vol. 5, pages 65 to 69, 1965, published by Academic Press, New York; in *Bulletin Chemical Society of Japan*, Vol. 29, pages 543 544, 1956; and agarose derivatives such as agaroseNHCH₂CH₂NH₂, commercially available as AF–101 of the Affitron Corp., 4737 Muscatel Ave., Rosemead, Calif. 91770, is prepared according to the following general reaction, wherein all the reactants in the reaction equation are in stoichiometric amounts or a slight excess thereof with the reaction conditions indicated in the equation. In the equation R.T. is room temperature of about 25°C, R.F. is reflux temperature, O.N. is over night, and pressure is atmospheric pressure.

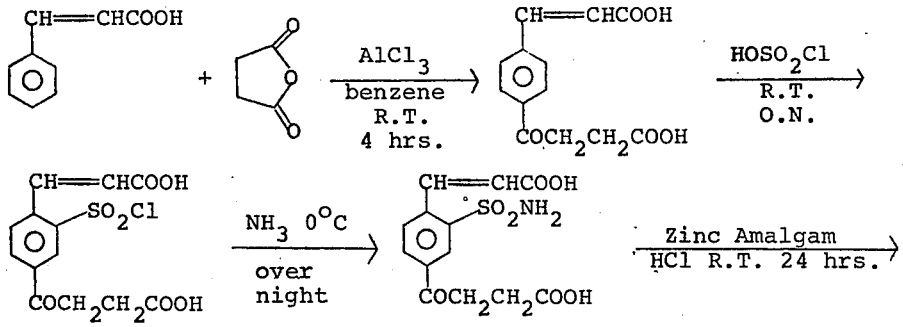

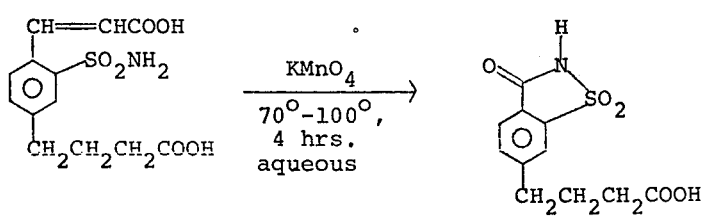
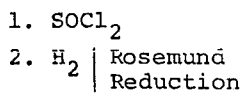

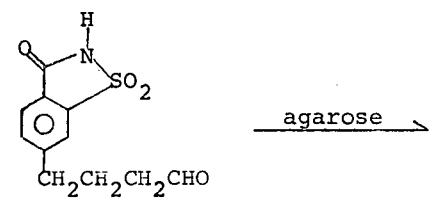

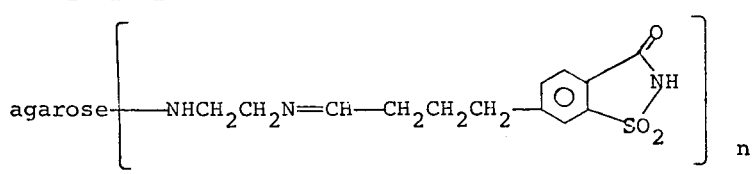

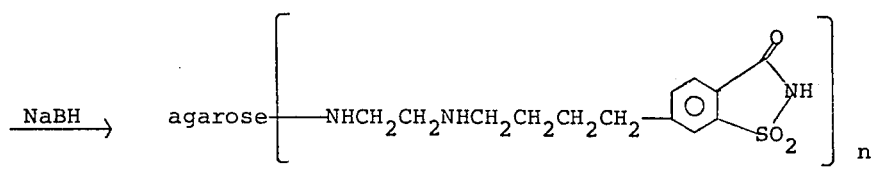

EXAMPLE 10

To commercially obtainable polysaccharide, Sepharose, having varying molecular weight ranges such as 1,000 – 20,000; 10,000 – 50,000; 30,000 – 100,000; etc., and also prepared according to the procedure in *Methods in Carbohydrate Chemistry*, Vol. V, pages 20 to 28, 1965, Academic Press, New York, there is covalently coupled by means of cyanogen bromide a compound of the formula $H_2N-R$ wherein R is alkylene budge of 1 to 18 carbon atoms attached to a sweetening moiety to yield a nonnutritive sweetener. The above reaction is described in *Nature*, London, Vol. 215, page 1,491, 1967. In the equation below, the dihydroxyl compound is the polymer Sepharose.

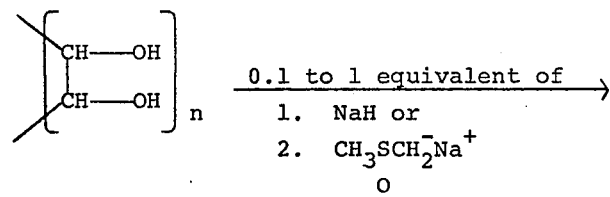

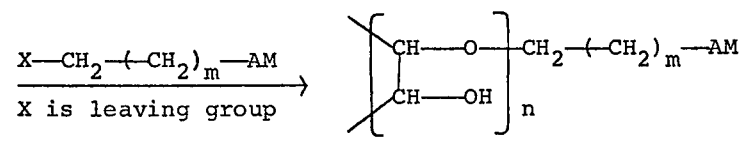

wherein m is 1 to 18, Am is an active sweetening group, and n > 1,000.

EXAMPLE 11

To one mole of

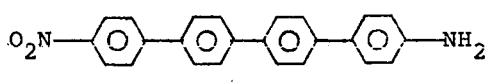

or

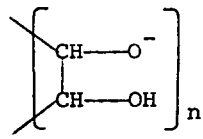

prepared according to the procedure in *Tetrahedron*, Vol. 10, pages 109 to 117, 1960, in 2 liters of dry ethanol there is added an excess of dry hydrogen, $H_2$, and the reactant hydrogenated in the presence of a Ni catalyst on a charcoal support under 300 atmospheres of hydrogen at 50°C. The hydrogenation is allowed to continue until sufficient hydrogen is consumed to saturate the reactant, that is, for 50 hours. Next, to 1 mole of the freshly prepared

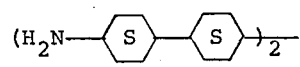

is added 1 liter of chloroform and 0.3 moles of chlorosulfonic acid added dropwise thereto and the reactants allowed to react at room temperature under normal atmospheric pressure for 15 to 20 minutes. Next, the amine salt is recovered by filtration and added to 2 liters of distilled water containing 0.5 moles of sodium carbonate. Finally, the reaction solvent is removed to yield the oligomer product

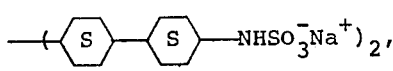

M.W. 512. The reaction used to prepare the oligomeric sweetener is described in *J. Org. Chem.*, Vol. 9, pages 89 to 101, 1944.

EXAMPLE 12

The esterification of 1 mole of α-O-fructose

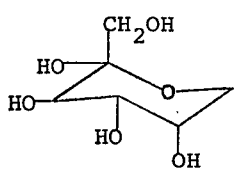

is carried out by treating the compound with an excess of ethyl vinyl ether, which also acts as a solvent for this reaction, followed by the addition of a trace of p-TsOH with subsequent distillation of ethanol to yield the following vinyl ethers:

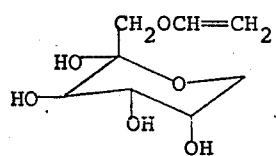 + 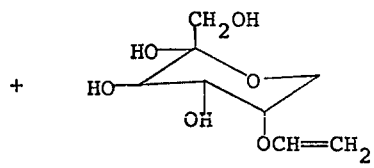

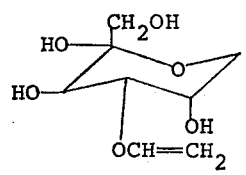 + 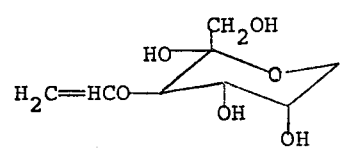

Next, to 1 mole of the mixture of α-D-fructose vinyl ether is added 0.01 mole of α,α′-azo-bis-isobutrylnitrile in 1 liter of acetone and the free radical polymerization carried out by refluxing for 24 to 48 hours. The product

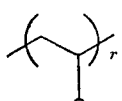

wherein $n$ is 10 to 100,000 is obtained by conventional evaporation of the solvent. The mixtures of α-D-fructose vinyl ethers may also be homopolymerized by the use of the various Lewis acids as described supra.

EXAMPLE 13

Repeating the procedure of Example 12, 1 mole of the mixture of α-D-fructose vinyl ethers is copolymerized with the monomer vinylpyrrolidone in acetone. The free radical polymerization is carried out in the presence of 0.01 mole of α,α′-azo-bis-isobutrylnitrile with continual refluxing for 24 to 48 hours. The product is recovered by filtration and dried in vacuo. In the formed product, of the formula

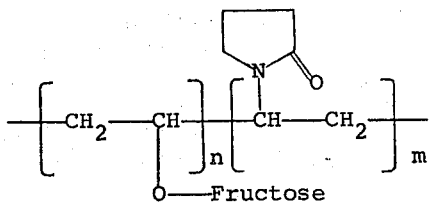

wherein the ratio of the mixture of α-D-fructose vinyl ethers to vinylpyrrolidone identified as $n$ and $m$ can vary from 1:1 to 1:10 with the copolymer having a molecular weight in excess of 500, usually 1,000 to 1,000,000. This reaction could alternatively be carried out by substituting maleic anhydride for the monomeric vinylpyrrolidone and the resulting copolymeric anhydride hydrolyzed to the water-soluble corresponding carboxylic acid.

EXAMPLE 14

To 0.01 moles of the dipeptide of the benzyl ester hydrochloride of aspartic acid and the methyl ester of tyrosine of the formula

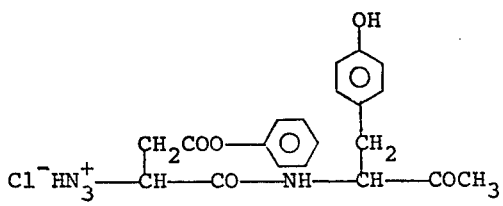

and prepared according to the procedure described in *J. Am. Chem. Soc.*, Vol. 91, pages 2,684 to 2,690, 1969, there is added dropwise 0.02 moles of NaOH in 100 ml of n-propanol and the reactants continually stirred for 2½ hours. Next, the sodium chloride formed is removed by filtering the reaction medium and the solvent evaporated to yield the corresponding salt,

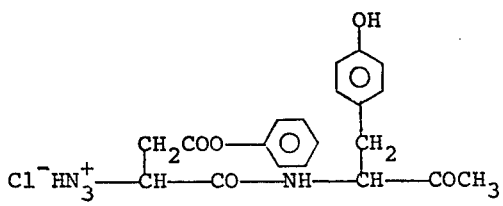

This salt is then converted to the ether acetal by refluxing 0.01 moles of the salt with 0.015 moles of bromoacetaldehyde dimethyl acetal, $BrCH_2CH_2(OEt)_2$ for 30 hours to give

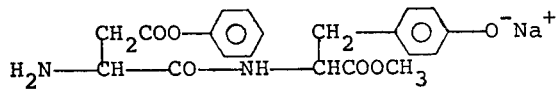

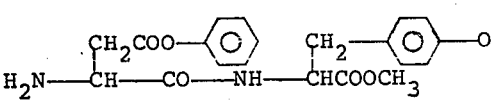

The acetal, 0.01 moles, is next reacted at room temperature for 24 hours with 0.01 moles of hydrochloric acid contained in 200 ml mixture of methanol and water to the corresponding aldehyde.

Five moles of the aldehyde is coupled with 5 to 30 mmoles of agarose amine to form the Schiff base, agarose—NH—CH₂CH₂N=CH—CH₂CH₂—O

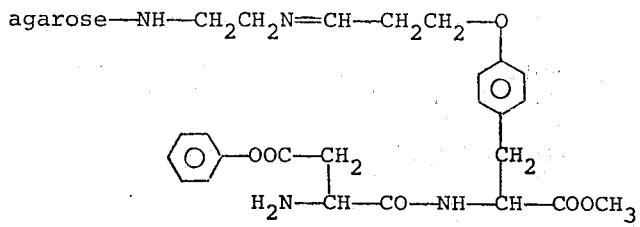

which is reduced with sodium borohydride to give the agarose bound sweetener agarose—NH—CH₂CH₂—NH—CH₂CH₂CH₂—O

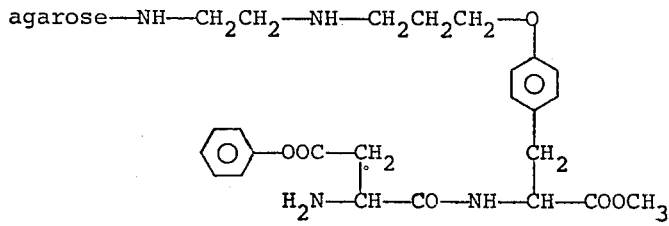

The artificial, nonnutritive sweeteners, (Am)ₙ C, of the invention are useful orally acceptable nonnutritive sweeteners. By orally acceptable nonnutritive sweetener is meant they can be taken orally singly or admixed with other substances partially or totally into the oral cavity and digestive tract of animals including humans, farm animals, sport and household animals, laboratory animals and avians to produce a preselected amount of sweetness without any direct or indirect unwanted or adverse effects. The compounds of the inventions can be mixed with liquids and solids, precooked and cooked substances, fresh and frozen products in amounts sufficient to give a sweet effect to the user. The compounds can be admixed with substances that are used orally for a short period of time such as chewing gum, toothpaste, cosmetics, mouthwash, tobacco products and the like or the nonnutritive sweeteners can be admixed with liquids that are retained for a prolonged period of time in the gastrointestinal tract, such as coffee, tea, cola, chocolate milk and the like.

The nonnutritive sweeteners of the invention can also be incorporated into any of a wide variety of foods including baked goods such as crackers, bread, pretzels, pastries, pies, cakes and the like; milk products such as ice cream, sherbet, custards and assorted puddings; gelatin products; cereal products; processed canned fruits, vegetables and juices; frozen vegetables; meat products such as sweet cured bacon and ham; and the like. The nonnutritive sweeteners can also be added to confectionary products such as candies, jellybeans, taffy, chocolate bars, licorice, divinity and the like. The nonnutritive sweetener can be added to form feeds such as silage, premixes, mash, pet snacks and the like.

The new and useful sweeteners of the invention can also be combined with medicinal and pharmaceutical formulations, including tablets, capsules, powders, lozenges, drops, elixirs, syrups, suspensions, oils, emulsions, and the like.

The amount of nonnutritive sweetener to be used is not critical so long as an effective amount is used. Usually, this is an amount which provides a sweetness comparable to other sweeteners. The amount of sweetener will vary for a particular animal or avian, or ingredient, and it will usually range from about 0.001 to 50 percent of the total weight of the composition containing the nonnutritive sweetener. Generally, for most food, precooked, freshly cooked, frozen, and the like the novel nonnutritive sweetener can be used in levels ranging from 0.01 p.p.m., where p.p.m. is parts per million, to 1,000,000 p.p.m. or higher based on the weight of an orally acceptable comestible substance which is a food, beverage, confectionary, medicine, and the like. Also, the nonnutritive sweeteners can be used alone, or in combination with any of the other nonnutritive sweeteners of the invention in an effective amount for stimulating a sensory receptor in the oral cavity to give a sweet response.

Comestible compositions of matter, that is foods including beverages, confectionaries and the like, are prepared according to the mode and manner of the invention by using the nonnutritive sweeteners in edible products in conventional ways. For example, an ice cream is prepared from ice cream forming ingredients such as milk, the yolk of eggs, any of the nonnutritive sweeteners of the invention, and other ingredients by processing the ice cream forming ingredients in the usual manner in an ice cream machine. Similarly, a milk pudding comprised of starch, salt, milk, the nonnutritive sweeteners, triacetin and other optional ingredients is prepared by cooking and solidifying the resulting pudding in the conventional manner. The novel and nonnutritive sweeteners can be used in other foods or beverages comprised of other food forming ingredients such as edible oils, gums, milk solids, shortening, cocoa, butter, propylene glycol destearate, bulking agents and the like as a sugar substitute wherever sugar was used.

The nonnutritive sweeteners of the invention are distinct from naturally occurring sugars since they are not converted to carbon dioxide, water and energy by the body while retaining their sweetening properties. Additionally, they do not have an insulin requirement, and because of the chemistry they are usually nonhydroscopic and do not caramelize as naturally occurring sugars do during processings of foods. Moreover, since the active sweetening group, Am, is essentially permanently joined through a covalent bond to a controller that transports it and allows the active agent to give a sweet result, while preventing its absorption and assimilation, any adverse effects inherent in the active sweetening group Am is retained by the compound (Am)ₙ C for eventual elimination from the gastrointestinal tract by the host. And, while the above examples and disclosure are set forth merely for illustrating the mode and the manner of the invention, various modifications and

I claim:

1. A nonabsorbable, nonnutritive, water-soluble sweetener composition comprised of an active sweetening agent covalently bonded through a position on the active sweetening agent that is nonessential for its sweetening activity, with a covalent bond that is capable of maintaining its physical and chemical integrity under the conditions of passage through the gastrointestinal tract, to a nonmetabolizable controller molecule which has a molecular weight in excess of 1,000 and at least one three-dimensional space-occupying group so as to be too large to be absorbed through the mucosa of the gastrointestinal tract and which thereby maintains the active sweetening agent within the gastrointestinal tract by substantially restricting the agent's passage from the mucosal to the serosal side of the gastrointestinal tract as the sweetener composition passes through the gastrointestinal tract.

2. A nonabsorbable, nonnutritive sweetener according to claim 1 wherein the controller molecule has a molecular weight of from 15,000 to 500,000.

3. A nonabsorbable, nonnutritive, water-soluble sweetener composition of the general formula $(Am)_n C$ wherein Am is a sweetening agent capable of stimulating a sweet response on contacting a sensory receptor in a warm-blooded animal, $\sim$ is a covalent bond that couples Am to C and is capable of substantially resisting rupture under the conditions of passage through the gastrointestinal tract, $n$ is at least one and C is a polymeric, nonbiodegradable matrix having a molecular weight of from 15,000 to 500,000 and molecular dimensions that substantially prevent passage of the sweetener composition from the gastrointestinal lumen into the systemic circulation.

4. A method of producing a sweet response in a warm-blooded animal comprised of contacting a taste receptor of said animal with an amount of a nonabsorbable, nonnutritive, water-soluble sweetener composition of the general formula $(Am)_n C$ wherein Am is a sweetening agent capable of sitmulating a sweet response on contacting a sensory receptor in a warm-blooded animal, $\sim$ is a covalent bond that couples Am to C and is capable of substantially resisting rupture under the conditions of passage through the gastrointestinal track, $n$ is at least one and C is a polymeric, nonbiodegradable matrix having a molecular weight of from 15,000 to 500,000 and molecular dimensions that substantially prevent passage of the sweetener composition from the gastrointestinal lumen into the systemic circulation.

5. A comestible composition of matter comprising a nonabsorbable, nonnutritive, water-soluble sweetener composition of the general formula $(Am)_n C$ wherein Am is a sweetening agent capable of stimulating a sweet response on contacting a sensory receptor in a warm-blooded animal, $\sim$ is a covalent bond that couples Am to C and is capable of substantially resisting rupture under the conditions of passage through the gastrointestinal tract, $n$ is at least one and C is a polymeric, nonbiodegradable matrix having a molecular weight of from 15,000 to 500,000 and molecular dimensions that substantially prevent passage of the sweetener composition from the gastrointestinal lumen into the systemic circulation, admixed in an effective amount with an edible substance.

6. The comestible composition of matter according to claim 5 wherein the edible substance is a foodstuff.

7. A method of sweetening a comestible composition of matter, which method is comprised of adding to said comestible composition of matter an effective amount to impart sweetness of a nonabsorbable, nonnutritive, water-soluble sweetener composition comprised of an active sweetening agent covalently bonded through a position on the sweetening agent that is nonessential for its sweetening activity, with a covalent bond that is capable of maintaining its physical and chemical integrity under the conditions of passage through the gastrointestinal tract, to a nonmetabolizable controller molecule which has a molecular weight in excess of 1,000 and at least one three-dimensional space-occupying group so as to be too large to be absorbed through the mucosa of the gastrointestinal tract and which thereby maintains the active sweetening agent within the gastrointestinal tract by substantially restricting the agent's passage from the mucosal to the serosal side of the gastrointestinal tract as the sweetener composition of said comestible substance pass through the gastrointestinal tract.

8. A method of sweetening a comestible composition of matter, which method is comprised of adding to said comestible composition of matter an effective amount to impart sweetness of a nonabsorbable, nonnutritive, water-soluble sweetener of the general formula $(Am)_n C$ wherein Am is a sweetening agent capable of stimulating a sweet response on contacting a sensory receptor in a warm-blooded animal, $\sim$ is a covalent bond that couples Am to C and is capable of substantially resisting rupture under the conditions of passage through the gastrointestinal tract, n is at least one and C is a polymeric, nonbiodegradable matrix having a molecular weight of from 15,000 to 500,000 and molecular dimensions that substantially prevent passage of the sweetener composition from the gastrointestinal lumen into the systemic circulation, as the sweetener composition and the comestible composition of matter pass through the gastrointestinal tract.

* * * * *